United States Patent

Melchiors et al.

[11] Patent Number: 6,130,285
[45] Date of Patent: *Oct. 10, 2000

[54] BINDER COMPOSITION AND ITS USE FOR COATING METALLIC AND MINERAL SUBSTRATES

[75] Inventors: Martin Melchiors, Aachen; Jürgen Schwindt, Leverkusen; Gerhard Ruttmann, Burscheid; Wieland Hovestadt, Krefeld; Joachim Probst, Leverkusen; Josef Pedain, Köln, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,510

[22] Filed: Aug. 14, 1997

[30] Foreign Application Priority Data

Aug. 23, 1996 [DE] Germany ................ 196 34 076

[51] Int. Cl.$^7$ ................................................ C08L 75/00
[52] U.S. Cl. ................................. 524/507; 525/131
[58] Field of Search .............................. 524/507

[56] References Cited

U.S. PATENT DOCUMENTS

| | | | |
|---|---|---|---|
| 3,523,093 | 8/1970 | Stamberger | 260/2.5 |
| 4,065,587 | 12/1977 | Ting | 528/59 |
| 4,312,972 | 1/1982 | Khanna | 528/64 |
| 4,380,604 | 4/1983 | Neuhaus | 524/873 |
| 4,404,324 | 9/1983 | Fock | 524/445 |
| 4,532,300 | 7/1985 | Lenz | 525/124 |
| 5,066,733 | 11/1991 | Martz | 525/455 |
| 5,183,831 | 2/1993 | Bielat | 526/208 |
| 5,248,752 | 9/1993 | Argyropoulos | 528/49 |
| 5,362,773 | 11/1994 | Brindoepke | 525/123 |
| 5,422,421 | 6/1995 | Hovestadt et al. | 528/355 |
| 5,684,083 | 11/1997 | Temple | 524/541 |

FOREIGN PATENT DOCUMENTS

96/11965  4/1996  WIPO .

OTHER PUBLICATIONS

Glasurit–Handbuch, Lacke und Farben, 11th Edition. p. 494 ff., Curt Vincentz Verlag, Hanover, (month unavailable) 1984.

DIN 55 928, Parts 5 and 9, May 1991.

Kunststoff Handbuch, vol. 7, Polyurethane 2nd edition, Editor G. Oertel, Hanser Verlag, Munick Vienna, (month unavailable) 1983, pp. 30–32.

*Primary Examiner*—Paul R. Michl
*Attorney, Agent, or Firm*—Joseph C. Gil; Thomas W. Roy

[57] ABSTRACT

The present invention relates to a solvent-free, low viscosity binder composition which contains, in amounts sufficient to provide an NCO:OH equivalent ratio of 0.5:1 to 2.0:1, A) a polyisocyanate component containing one or more organic polyisocyanates and B) a solvent-free polyhydroxy component having a hydroxyl group content of 3.0 to 18 wt. % and a viscosity at 23° C. of 200 to 10,000 mPa.s, which contains $B_1$) a hydroxy-functional polyacrylate component which is prepared by polymerizing a mixture of olefinically unsaturated monomers in which at least one monomer is hydroxy-functional in the presence of $B_2$) a compound containing ether groups and having one or more hydroxy groups.

The invention also relates to the use of this binder composition in solvent-free two-component polyurethane coating compositions for coating metallic or mineral substrates.

9 Claims, No Drawings

BINDER COMPOSITION AND ITS USE FOR COATING METALLIC AND MINERAL SUBSTRATES

BACKGROUND OF THE INVENTION

1. Field of the Invention

The present invention relates to binder compositions for preparing solvent-free coating compositions and to their use as coatings for protecting metallic and mineral substrates against corrosion, erosion and mechanical damage.

2. Description of the Prior Art

Coatings to protect substrates against damage such as corrosion, erosion or mechanical damage caused by external influences are known and described, for example, in Glasurit-Handbuch, Lacke und Farben, 11th Edition, p.494 ff., Curt R. Vincentz Verlag, Hanover, 1984 and DIN 55 928, Parts 5 and 9.

These coating compositions may be divided into one-component systems (1C), two-component epoxy resin systems (2C-EP) and two-component polyurethane systems (2C-PUR). Although physically drying 1C coating compositions (e.g., vinyl chloride copolymers or acrylate copolymers) have good resistance to aqueous salt solutions, acids and bases, they have poor resistance to animal or vegetable fats and greases, solvents and chemicals. In addition, these copolymers require large amounts of organic solvents to formulate binder mixtures having viscosities that meet practical requirements.

Oxidatively drying 1C coating compositions (e.g, alkyd resins and epoxy resin esters) are characterized by good substrate adhesion and improved resistance to solvents and chemicals, but deteriorate when attacked by acids or bases. The binder compositions also require organic solvents when preparing formulations to meet practical requirements.

Coatings based on 2C-EP combine good mechanical strength with good resistance to solvents, chemicals, acids and bases, and are additionally characterized by very good substrate adhesion. The binder compositions can be formulated as low-solvent, solvent-free or aqueous compositions. A significant disadvantage of the resulting coatings is their known poor elasticity, especially at low temperatures (see for example Kunststoff-Handbuch, Vol. 7; Polyurethanes, 2nd Edition, Editor G. Oertel, Hanser Verlag, Munich, Vienna, 1983, pp. 556–8). This brittleness leads to poor crack coverage by the coating, with the result that the substrate can be attacked.

A balanced combination of hardness and elasticity is a valuable property of 2C-PUR coatings and a major advantage when compared to 2C-EP coatings. Although the resistance of 2C-PUR coatings to chemicals, solvents, acids and bases is just as good as that of 2C-EP systems, the substrate adhesion is generally worse.

The hydroxy-functional binder component of 2C-EP coating compositions can be based on various types of chemical structures. For example, 2C-PUR coatings based on polyacrylate polyols have good light and weathering resistance and are also resistant to saponification, solvents and chemicals. A disadvantage is the relatively high viscosity of the binder compositions, which often requires the use of organic solvents.

2C-PUR binder compositions based on polyester polyols have significantly lower viscosities and, thus, can be formulated to be solvent-free. Although they exhibit good resistance to chemicals, solvents, weathering and light, these coatings have the disadvantage of poor resistance to saponification, which severely restricts their use for corrosion protection of metallic substrates and also for coating mineral (alkaline) substrates.

Hydroxy-functional polyester polyacrylate binders for lightfast, solvent-free coating compositions are described in EP-A-580,054. These products combine the good resistance properties of the polyacrylates with the low viscosities of the polyesters, but require relatively large amounts of hydrophobic reactive thinners to achieve a sufficiently low viscosity as well as cyclic esters to extend the hydroxy side groups of the polyacrylate chains with hydroxyester units.

2C-PUR coatings based on polyether polyols exhibit significantly better resistance to saponification as well as good resistance to solvents and chemicals. Also, the binder compositions due to their low viscosity can be formulated to be low-solvent or solvent-free. However, these coatings have the disadvantage of poor substrate adhesion and poor resistance to weathering and light.

An object of the present invention is to provide a solvent-free, low viscosity coating composition that does not exhibit the disadvantages of the prior art and can be used to prepare coatings for metallic substrates or mineral substrates having good resistance to corrosion, erosion and mechanical damage.

It has now surprisingly been found that this object can be achieved with a binder composition based on a polyisocyanate and a polyether polyacrylate.

SUMMARY OF THE INVENTION

The present invention relates to a solvent-free, low viscosity binder composition which contains, in amounts sufficient to provide an NCO:OH equivalent ratio of 0.5:1 to 2.0:1, A) a polyisocyanate component containing one or more organic polyisocyanates and B) a solvent-free polyhydroxy component having a hydroxyl group content of 3.0 to 18 wt. % and a viscosity at 23° C. of 200 to 10,000 mPa.s, which contains $B_1$) a hydroxy-functional polyacrylate component which is prepared by polymerizing a mixture of olefinically unsaturated monomers in which at least one monomer is hydroxy-functional in the presence of $B_2$) a compound containing ether groups and having one or more hydroxy groups.

The invention also relates to the use of this binder composition in solvent-free two-component polyurethane coating compositions for coating metallic or mineral substrates.

DETAILED DESCRIPTION OF THE INVENTION

Polyisocyanate component A) is selected from organic polyisocyanates having an average NCO functionality of at least 2 and a molecular weight of at least 140.

Examples include (i) monomeric organic polyisocyanates having a molecular weight of 140 to 300, (ii) lacquer polyisocyanates having a molecular weight of 300 to 1000, (iii) NCO prepolymers containing urethane groups and having a molecular weight above 1000, and mixtures of (i) to (iii).

Examples of monomeric polyisocyanates (i) include 1,4-diisocyanato-butane, 1,6-diisocyanatohexane (HDI), 1,5-diisocyanato-2,2-dimethyl-pentane, 2,2,4- and 2,4,4-trimethyl-1,6-diisocyanatohexane, 1-isocyanato-3,3,5-trimethyl-5-isocyanatomethyl-cyclohexane (IPDI), 1-isocyanato-1-methyl-4(3)-isocyanatomethylcyclohexane, bis-(4-isocyanatocyclo-hexyl)methane, 1,10-diisocyanatodecane, 1,12-diisocyanatododecane, cyclohexane-1,3- and/or 1,4-diisocyanate, xylylene diisocyanate isomers, 2,4-diisocyanatotoluene and mixtures thereof with 2,6-diisocyanatotoluene (preferably with up to 35 wt. %, based on the weight of the mixture, of 2,6-diisocyanatotoluene), 2,2'-, 2,4"-, and/or 4,4'-diisocyanatodiphenylmethane and mixtures thereof with higher homologs obtained by the phosgenation of aniline/formaldehyde condensates, and mixtures of the preceding polyisocyanates. Preferred compounds are polyisocyanates of the diphenylmethane series, isomeric mixtures being particularly preferred.

Polyisocyanates (ii) are selected from the known lacquer polyisocyanates, which are obtained by oligomerizing monomeric diisocyanates (i) to form carbodiimide, uretdione (dimers), isocyanurate (trimers), biuret, urea, urethane, allophanate and/or oxadiazine groups. Often several of these groups are formed simultaneously or successively during "oligomerization." Preferred lacquer polyisocyanates are a) biuret group-containing polyisocyanates, b) isocyanurate group-containing polyisocyanates, c) isocyanurate group- and uretdione group-containing polyisocyanates, d) urethane group- and/or allophanate group-containing polyisocyanates and e) isocyanurate group- and allophanate group-containing polyisocyanates.

The preparation of these lacquer polyisocyanates is known and described for example in DE-A 1,595,273, DE-A 3,700,209, DE-A 3,900,053, EP-A-0,330,966, EP-A-0,259,233, EP-A-0,377,177, EP-A-0,496,208, EP-A-0,524,501 and U.S. Pat. No. 4,385,171.

Polyisocyanates (iii) are selected from the known isocyanate group-containing prepolymers, which are prepared by reacting monomeric diisocyanates (i) and/or lacquer polyisocyanates (ii) with organic polyhydroxyl compounds having a molecular weight of >300. Whereas the urethane group-containing lacquer polyisocyanates of group (ii) are derivatives of low molecular weight polyols having a molecular weight of 62 to 300 (such as ethylene glycol, propylene glycol, trimethylolpropane, glycerol or mixtures thereof), the polyhydroxyl compounds used to prepare NCO prepolymers (iii) are those having a number average molecular weight (which may be determined from the hydroxy group content and the functionality) of >300, preferably >500, and more preferably 500 to 4000. These polyhydroxyl preferably have 2 to 6, more preferably 2 to 3 hydroxyl groups per molecule and are selected from ether, ester, thioether, carbonate and/or polyacrylate polyols.

When preparing NCO prepolymers (iii) the high molecular weight polyols can be used mixed with the low molecular weight polyols so that mixtures of urethane group-containing lacquer polyisocyanates (ii) and NCO prepolymers (iii) are directly formed for use as starting component A) according to the invention.

To prepare NCO prepolymers (iii) or mixtures thereof with lacquer polyisocyanates (ii), diisocyanates (i) or lacquer polyisocyanates (ii) are reacted with the high molecular weight hydroxyl compounds or mixtures thereof with low molecular weight polyhydroxyl compounds at an NCO/OH equivalent ratio of 1.1:1 to 40:1, preferably 2:1 to 25:1, to form urethane groups. When using an excess of distillable starting diisocyanate, the excess can be removed by distillation following the reaction so that monomer-free NCO prepolymers are formed. If an excess of diisocyanates are used and they are not removed by distillation, then mixtures of monomeric diisocyanates (i) and NCO prepolymers (iii) are formed for use as starting component A) according to the invention. Polyhydroxy component B) has a hydroxyl group content of 3.0 to 18.0 wt. %, preferably 5.0 to 15 wt. %, and a viscosity at 23° C. of 200 to 10,000 mPa.s, preferably 300 to 5000 mPa.s. Component B) is preferably prepared by the free radical polymerization of $B_1$) 20 to 80 parts by weight of a mixture of olefinically unsaturated monomers, which preferably contains 5 to 50 wt. %, based on the weight of $B_1$), of alcoholic hydroxyl group-containing monomers in the presence of $B_2$) 20 to 80 parts by weight of a polyether containing one or more hydroxyl groups and having a number average molecular weight of 106 to 4000 and a hydroxyl group content of 1.0 to 30.0 wt. % and $B_3$) 0 to 25 parts by weight of another hydroxy-functional compound that has a maximum number average molecular weight of 1000, with the aid of free radical formers as polymerization initiators and optionally other additives, for example, molecular weight regulators.

Monomers $B_1$) are mono-unsaturated compounds having a molecular weight of 53 to 400, preferably 80 to 220. Suitable compounds include acrylic acid and methacrylic acid alkyl esters or cycloalkyl esters having 1 to 18, preferably 1 to 8 carbon atoms in the alkyl or cycloalkyl radical. Examples include the methyl, ethyl, n-propyl, n-butyl, isopropyl, isobutyl, t-butyl, and isomeric pentyl, hexyl, octyl, dodecyl, hexadecyl or octadecyl esters of acrylic acid and methacrylic acid, acetoacetoxyethyl methacrylate, acrylonitrile, vinyl ether, methacrylonitrile, vinyl acetate, styrene and vinyl toluene. Also suitable are carboxyl group-containing, unsaturated monomers, such as acrylic acid, methacrylic acid, itaconic acid, crotonic acid and semi-esters of maleic and fumaric acid. Mixtures of these and/or other monomers may also be used.

Suitable alcoholic hydroxyl group-containing monomers include the hydroxyalkyl esters of α,β-unsaturated carboxylic acids, preferably acrylic acid or methacrylic acid, having 2 to 12, preferably 2 to 6 carbon atoms in the hydroxyalkyl radical. Examples include 2-hydroxyethyl acrylate, the isomeric hydroxypropyl acrylates obtained by addition of 1 mole of propylene oxide to 1 mole of acrylic acid, 2-, 3- and 4-hydroxybutyl acrylate, the isomeric hydroxyhexyl acrylates and the methacrylates corresponding to these acrylates. Also suitable are hydroxy-functional monomers modified or chain-extended with ethylene oxide, propylene oxide and/or butylene oxide and having a maximum molecular weight of 376.

Hydroxyl group-containing component $B_2$) is selected from ether group-containing, monohydric or polyhydric alcohols having a molecular weight of 106 to 4000, preferably 200 to 1100 and most preferably 200 to 500; a hydroxyl group content of 1.0 to 30.0, preferably 3.0 to 16.0 and more preferably 8.0 to 16.0 wt. %; and a viscosity at 23° C. of preferably 30 to 1000, more preferably 50 to 700 mPa.s. Preferred compounds are polyether polyols having 2 or more hydroxy groups per molecule, such as those obtained in manner known by the addition of cyclic ethers (alkylene oxides) such as ethylene oxide, propylene oxide, styrene oxide, butylene oxide and/or tetrahydrofuran to starter molecules such as water, ether group-free, polyhydric alcohols, aminoalcohols and/or amines. Particularly preferred are polyethers that are synthesized in an amount of at least 50%, preferably at least 90%, based on the weight of alkylene oxide units, of propylene oxide units of the formula —CH(CH$_3$)CH$_2$O—.

Polyhydric alcohols that are suitable as starter molecules include ethylene glycol, propanediol-1,2 and -1,3, butanediol-1,2,-1,3,-1,4 and -2,3, pentanediol-1,5, 3-methylpentanediol-1,5, hexanediol-1,6, octanediol-1,8, 2-methylpropane-diol-1,3, 2,2-dimethylpropanediol-1,3, 2-ethyl-2-butylpropane-diol-1,3, 2,2,4-trimethylpentanediol-1,3, 2-ethylhexanediol-1,3, higher molecular weight α, ω-alkanediols having 9 to 18 carbon atoms, cyclohexane-dimethanol, cyclohexanediols, glycerol, trimethylol propane, butanediol-1,2,4, hexanetriol-1,2,6, bis-(trimethylol)propane, pentaerythritol, mannitol and methyl glycoside.

Suitable aminoalcohols include 2-aminoethanol, 2-(methylamino)-ethanol, diethanolamine, 3-amino-1-propanol, 1-amino-2-propanol, diisopropanolamine, 2-amino-2-hydroxymethyl-1,3-propanediol or mixtures thereof.

Suitable polyhydric amines include aliphatic or cycloaliphatic amines such as ethylenediamine, 1,2-diaminopropane, 1,3-diaminopropane, 1,4-diaminobutane, 1,3-diamino-2,2-dimethylpropane, 4,4-diaminodicyclohexyl-methane, isophoronediamine, hexamethylenediamine, 1,12-dodecane-diamine or mixtures thereof.

Besides the difunctional and higher functional polyether polyols, monohydroxy polyethers may also be used either alone or mixed with the di- and higher functional polyether polyols. Monohydroxy polyethers can be obtained in a similar manner to the previously described polyether polyols by the addition of alkylene oxides to monoalcohols, especially linear or branched aliphatic or cycloaliphatic monohydroxyalkanes. Examples include methanol, ethanol, propanol, butanol, hexanol, 2-ethylhexanol, cyclohexanol and stearyl alcohol; and secondary aliphatic or cycloaliphatic monoamines such as dimethylamine, diethylamine, diisopropylamine, dibutylamine, N-methylstearylamine, piperidine and morpholine.

Higher functional polyether polyols, preferably those having 2 or 3 hydroxy groups per polyether molecule, are preferred.

Alcohol component $B_3$) is selected from hydroxy compounds having a number average molecular weight of 32 to 1000. Low molecular weight hydroxy compounds having a molecular weight of 32 to 350 and a hydroxyl group content of at least 6% are preferably used. Examples include methanol, ethanol, propanol, butanol, hexanol, 2-ethylhexanol, cyclohexanol, stearyl alcohol, ethylene glycol, diethylene glycol, triethylene glycol, propanediol-1,2 and -1,3, dipropylene glycol, tripropylene glycol, butanediol-1,2,-1,3,-1,4 and -2,3, pentanediol-1,5, 3-methylpentanediol-1,5, hexanediol-1,6, 2-ethylhexanediol-1,3, 2-methyl-propanediol-1,3, 2,2-dimethylpropanediol-1,3, 2-butyl-2-ethylpropanediol-1,3, 2,2,4-trimethylpentanediol-,3, octanediol-1,8, higher molecular weight α,ω-alkanediols having 9 to 18 carbon atoms, cyclohexanedimethanol, cyclohexanediol, glycerol, trimethylol propane, butanetriol-1,2,4, hexanetriol-1,2,6, bis(trimethylol propane), pentaerythritol, mannitol and methyl glycoside.

Also suitable as component $B_3$) are the hydroxy polyesters, hydroxy polyester amides, hydroxy polycarbonates and hydroxy polyacetals known from polyurethane chemistry and having a number average molecular weight of up to 1000.

In the preparation of polyhydroxy component B) the weight ratio of component B1) to the sum of components $B_2$) and $B_3$) is preferably 20:80 to 80:20, more preferably 35:65 to 65:35. Most preferably polyhydroxy component B) does not contain alcohols $B_3$).

Polyhydroxy component B) is prepared by a free radical polymerization in the feed process, which is known per se and is described for example in EP-A 580,054 (U.S. Pat. No. 5,422,421, herein incorporated by reference). Preferably at least 50 wt. %, more preferably 100 wt. %, of component $B_2$) is placed in the polymerization vessel and heated to the reaction temperature of 80 to 220° C., preferably 120 to 200° C. Monomer mixture $B_1$), any remaining portions of the components $B_2$) and $B_3$) and polymerization initiator C are then added. After addition the reaction mixture is stirred until the reaction is complete at a temperature that is 0 to 80° C., preferably 0 to 50° C., below the original reaction temperature. Component $B_3$) can also be added after the polymerization reaction is complete.

Examples of suitable polymerization initiators include dibenzoyl peroxide, di-tert-butyl peroxide, dilauryl peroxide, dicumyl peroxide, didecanoyl peroxide, tert.-butylperoxy-2-ethyl hexanoate, tert.-butyl perpivalate and butylperoxy-benzoate, and also azo compounds such as 2,2'-azobis(2,4-dimethylvaleronitrile), 2,2-azobis (isobutyronitrile), 2,2'-azobis(2,3-dimethylbutyronitrile), and 1,1'-azobis(1-cyclohexanenitrile).

It is sometimes necessary to carry out a post-activation by the subsequent addition of small amounts of initiator to achieve complete monomer conversion. In certain cases if too small a conversion is found after terminating the reaction and the reaction mixture still contains relatively large amounts of unsaturated monomers, these compounds may either be removed by distillation or they may be reacted by renewed post-activation with an initiator or catalyst with simultaneous heating at the reaction temperature.

In the preparation of polyhydroxy component B), molecular weight regulators may optionally be used, such as n-dodecyl mercaptan, tert.-dodecyl mercaptan, the α-olefins described in EP-A 471,258-A having a low polymerization tendency, and the derivatized dienes described in EP-A 597,747-B1. These compounds are in amounts of up to 20 wt. %, preferably up to 10 wt. %, based on the total weight of component B).

The antioxidants and/or light stabilizers, which are known from lacquer technology, may optionally be added to polyhydroxy component B) as stabilizers to further improve the light and weathering stability of the polyether polyacrylate; however, the binder compositions according to the invention are preferably used free of these stabilizers. Suitable antioxidants include sterically hindered phenols such as 4-methyl-2,6-di-tert.-butylphenol (BHT) and other substituted phenols, such as those obtainable from Ciba Geigy under name "Irganox" thioethers (e.g., "Irganox PS", Ciba Geigy) or phosphites (e.g., "Irgaphos", Ciba Geigy). Suitable light stabilizers include "HALS" amines (hindered amine lights tabilizers), for example the Tinuvin 622D or Tinuvin 765 light stabilizers from Ciba Geigy and the substituted benzotriazoles, for example Tinuvin 234, Tinuvin 327 or Tinuvin 571, which a re available from Ciba Geigy.

To prepare the coating compositions according to the invention components A) and B) are mixed together in amounts corresponding to an NCO:OH equivalent ratio of 0.5:1 to 2.0:1, preferably 0.8:1 to 1.5:1; The known additives from coatings technology may optionally be added to the individual components during or after this mixing. These additives include flow control agents, viscosity-controlling additives, pigments, fillers, flatting agents, UV stabilizers and anti-oxidants and catalysts for the cross-linking reaction.

The coating compositions according to the invention are particularly suitable as solvent-free two-component polyurethane coatings for protecting metallic substrates against mechanical damage and corrosion, and also for protecting mineral substrates, for example concrete, against environmental influences and mechanical damage.

The following examples are intended to illustrate the invention in more detail but without restricting it. All percentages are weight percentages. Viscosity measurements were carried out in a rotational viscometer according to DIN 53019 at a shear rate of 9.24 s$^{-1}$ or 28.9$^{-1}$.

EXAMPLES

Polyisocyanates used:
A) A lacquer polyisocyanate containing biuret groups, based on 1,6-diisocyanatohexane and having an NCO content of 23.0% and a viscosity at 23° C. of 2750 mPa.s (Desmodur N 3200 from Bayer AG, Leverkusen).
B) An ether group-containing NCO-prepolymer based on a propyleneoxide polyether started with trimethylol propane having an OH content of 1,7% and 4,4'-diphenylmethane diisocyanate having a NCO content of 23.0% and a viscosity at 25° C. of 240 mPa.s.

Polyether polyols used:
A) A branched polyether based on propylene oxide and having a number average molecular weight of 437, a viscosity at 23° C. of 600 mPa.s, and an OH content of 11.7% (Desmophen 550 U from Bayer AG),
B) A linear polyether based on propylene oxide (started with propylene glycol) and having a number average molecular weight of 218, a viscosity at 23° C. of 55 mPa.s, and an OH content of 15.6%,
C) A linear polyether based on propylene oxide and having a number average molecular weight of 416, a viscosity at 23° C. of 70 mPa.s and an OH content of 8.2% (Desmophen 4000 Z from Bayer AG),
D) A linear polyether based on propylene oxide and having a number average molecular weight of 1002, a viscosity at 23° C. of 140 mPa.s and an OH content of 3.4% (Desmophen 1600 U from Bayer AG),
E) A 36:64 mixture of a branched polyether based on propylene oxide and having a number average molecular weight of 3000, a viscosity at 23° C. of 500 mPa.s, and an OH content of 1.7%, and a branched polyether based on propylene oxide started with ethylenediamine and having a number average molecular weight of 477, a viscosity at 23° C. of 5400 mPa.s and an OH content of 14.2%.

Examples 1 to 8

General procedure for preparing the polyether polyacrylates set forth in Table 1

Part I was heated in a reaction vessel while stirring at the polymerization temperature. Part II was continuously added over a period of 3 hours and, simultaneously, Part III was continuously added over a period of 3½ hours. After a further 2 hours at the same temperature the product was cooled to room temperature and optionally mixed with Part IV.

The composition of Parts I to IV, the polymerization temperature, the OH content and the viscosity of the resulting products are set forth in Table 1.

TABLE 1

Preparation of the polyether polyacrylates

| Example | | 1 | 2 | 3 | 4 | 5 | 6 | 7 | 8 |
|---|---|---|---|---|---|---|---|---|---|
| Part I | | | | | | | | | |
| Polyether A | [g] | | | 25.0 | 30.0 | 60.0 | 40.0 | 50.0 | 49.9 |
| Polyether B | [g] | | 20.0 | 25.0 | 15.0 | | | | |
| Polyether C | [g] | | 30.0 | | 15.0 | | | | |
| Polyether D | [g] | 60.0 | | | | | | | |
| Part II | | | | | | | | | |
| 2-ethyl-hexyl-acrylate | [g] | | 33.5 | 32.0 | 26.5 | 26.5 | 19.4 | 15.9 | 16.2 |
| Butylacrylate | [g] | 12.8 | | | | | | | |
| Styrene | [g] | 9.6 | 9.0 | 10.0 | 7.5 | 7.5 | 7.4 | 6.1 | 6.2 |
| Hydroxyethyl | [g] | 13.8 | 4.0 | 4.4 | 3.0 | 3.0 | 8.2 | 8.2 | 8.3 |
| Part III | | | | | | | | | |
| Di-tert.-butyl-peroxide | [g] | 3.8 | 3.5 | 3.6 | 3.0 | 3.0 | 2.4 | 2.4 | 2.5 |
| Part IV | | | | | | | | | |
| 2,2,4-trimethylpentane-diol | [g] | | | | | | 22.6 | | |
| Dipropylene glycol | [g] | | | | | | | | 16.9 |
| 2-ethyl-hexanediol | [g] | | | | | | | 18.4 | |
| Polymerization temperature | [° C.] | 165 | 175 | 180 | 180 | 180 | 180 | 180 | 180 |
| OH content | [%] | 3.9 | 6.0 | 7.2 | 7.3 | 7.5 | 10.5 | 11.1 | 11.1 |
| Viscosity (23° C.) | mPa·s | 2900 | 440 | 1020 | 560 | 1260 | 1490 | 1110 | 1200 |

Examples 9 to 15

General procedure for preparing the binder compositions and their use.

The catalyst and additives were added to the lacquer polyisocyanate and the polyether polyacrylate and homogeneously mixed. The binder composition was then applied to the test substrate. The composition, the Shore-D hardness, and the test conditions and results of the weathering and adhesion tests are set forth Tables 2 and 3.

TABLE 2

Preparation and use of the binder compositions in the building and construction sector for coating concrete.

| Example | | 9 | 10 | 11 (comparison) |
|---|---|---|---|---|
| Polyether polyacrylate from Ex. 7 | [g] | 100 | | |
| Polyether polyacrylate from Ex. 8 | [g] | | 100 | |
| Polyether polyol A | [g] | | | 100 |
| Drying agent[a] | [g] | 10 | 10 | 10 |
| Defoamer[b] | [g] | 0.4 | 0.4 | 0.4 |
| Dibutyltin dilaurate | [g] | 0.1 | 0.1 | 0.2 |
| Polyisocyanate A | [g] | 122 | 122 | 122 |
| NCO:OH equivalent ratio | | 1:1 | 1:1 | 1:1 |
| Pot life[c] | [min] | 40 | 40 | 35 |
| Shore-D hardness according to DIN 53505 | | 73 | 74 | 75 |
| Blistering | | 0 | 0 | 0 |
| Weathering | | 3 | 4 | 5 |

[a]Baylith L paste from Bayer AG
[b]Byk A 530 from Byk Chemie GmbH
[c]Time for the viscosity to double
Conditions: Film thickness 2 mm, film properties after 3 days, 50° C., blistering and weathering values from 0 to 5 (0 = best value, 5 = worst value).

TABLE 3

Preparation and use of the binders in corrosion protection in the coating of steel

| Example | | 12 | 13 | 14 | 15 (comparison) |
|---|---|---|---|---|---|
| Polyether polyacrylate from Ex. 7 | [g] | 100 | | | |
| Polyether polyacrylate from Ex. 5 | [g] | | 100 | | |
| Polyether polyacrylate from Ex. 4 | [g] | | | 100 | |
| Polyether polyol E | [g] | | | | 100 |
| Butanediol-1,4 | [g] | 33 | 16 | 16 | 16 |
| Drying agent[a] | [g] | 20 | 24 | 24 | 24 |
| Defoamer[b] | [g] | 1.5 | 1.6 | 1.6 | 1.6 |
| Diazabicyclo[2,2,2]-octane 10% | [g] | 1.9 | 1.5 | 1.5 | 1.5 |
| Polyisocyanate B | [g] | 256 | 180 | 180 | 180 |
| NCO:OH equivalent ratio | | 1:1 | 1:1 | 1:1 | 1:1 |
| Pot life[c] | [min] | 3 | 3 | 8 | 1 |
| Shore-D hardness according to DIN 53505 | | 70 | 74 | 66 | 74 |
| Blistering | | 1–2 | 1–2 | 1 | 2 |
| Adhesion to steel | | 1 | 1 | 1 | 3 |
| Wet adhesion (25° C.) | | | | | |
| after 1 day | | 0–1 | 0–1 | 1 | 3 |
| after 7 days | | 1 | 1–2 | 3 | 3 |
| CD test[d] Adhesion | [mm] | | | 0 | 5 |
| Undersurface migration | | | | 0 | 17 |

Conditions: wet film thickness 400 μm; film properties after 1 day; film stored for 7 days at room temperature before adhesion testing; blistering and adhesion values from 0 to 5 (0 = best value; 5 = worst value).
[a]Baylith L-paste from Bayer AG
[b]Byk 085 from Byk Chemie GmbH
[c]Time for the viscosity to double Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solvent-free, low viscosity binder composition which comprises, in amounts sufficient to provide an NCO:OH equivalent ratio of 0.5:1 to 2.0:1,
   A) a polyisocyanate component containing one or more organic polyisocyanates and
   B) a solvent-free polyhydroxy component having a hydroxyl group content of 3.0 to 18 wt. % and a viscosity at 23° C. of 200 to 10,000 mPa.s, which comprises
      $B_1$) a hydroxy-functional polyacrylate component which is prepared by polymerizing a mixture of olefinically unsaturated monomers in which at least one monomer is hydroxy-functional in the presence of
      $B_2$) a compound containing ether groups and having one or more hydroxy groups.

2. The binder composition of claim 1 wherein polyhydroxy component B) has a hydroxyl group content of 5.0 to 15.0 wt. % and a viscosity at 23° C. of 300 to 5000 mPa.s.

3. The binder composition of claim 1 wherein polyhydroxy component B) is prepared by the free radical polymerization of
   $B_1$) 20 to 80 parts by weight of a mixture of olefinically unsaturated monomers, which preferably contains 5 to 50 wt. %, based on the weight of $B_1$), of alcoholic hydroxyl group-containing monomers in the presence of
   $B_2$) 20 to 80 parts by weight of a polyether containing one or more hydroxyl groups and having a number average molecular weight of 106 to 4000 and a hydroxyl group content of 1.0 to 30.0 wt. % and
   $B_3$) 0 to 25 parts by weight of another hydroxy-functional compound that has a maximum number average molecular weight of 1000.

4. The binder composition of claim 3 wherein the weight ratio of component $B_1$) to the sum of components $B_2$) and $B_3$) is 35:65 to 65:35.

5. The binder composition of claim 3 wherein component $B_2$) has number average molecular weight of 200 to 1100, a hydroxyl group content of 3.0 to 16.0 wt. % and a viscosity at 23° C. of 30 to 1000 mPa.s, and component $B_3$) has a molecular weight of at most 350 and a hydroxyl group content of at least 6%.

6. The binder composition of claim 3 wherein component $B_2$) has a number average molecular weight of 200 to 500, a hydroxyl group content of 8.0 to 16.0% and a viscosity at 23° C. of 50 to 700 mPa.s, and comprises a polyether which has two or more hydroxy groups and contains at least 90%, based on the weight of alkylene oxide units, of propylene oxide units of the formula —$CH(CH_3)CH_2O$—.

7. The binder composition of claim 6 wherein component B) does not contain component $B_3$).

8. A two-component polyurethane coating composition for coating metallic or mineral substrates, which contains the binder composition of claim 1.

9. A solvent-free, low viscosity binder composition which comprises, in amounts sufficient to provide an NCO:OH equivalent ratio of 0.5:1 to 2.0:1,
   A) a polyisocyanate component containing one or more organic polyisocyanates and
   B) a solvent-free polyhydroxy component having a hydroxyl group content of 3.0 to 18 wt. % and a viscosity at 23° C. of 200 to 10,000 mPa.s, prepared by the free radical polymerization of
      $B_1$) 20 to 80 parts by weight of a mixture of olefinically unsaturated monomers, which contains 5 to 50%, based on the weight of $B_1$), of alcoholic hydroxyl group-containing monomers in the presence of $B_2$) 20 to 80 parts by weight of a polyether containing one or more hydroxyl groups and having a number average molecular weight of 106 to 4000 and a hydroxyl group content of 1.0 to 30.0 wt. % and $B_3$) 0 to 25 parts by weight of another hydroxy-functional compound that has a maximum number average molecular weight of 1000, wherein the weight ratio of component $B_1$) to the sum of components $B_2$) and $B_3$) is 35:65 to 65:35.

* * * * *